Figure 1:
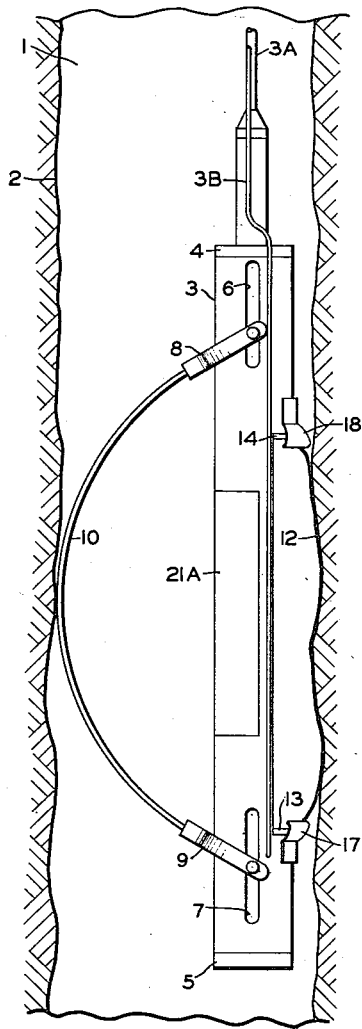

Jan. 26, 1954  R. G. PIETY  2,667,109
CAMERA ASSEMBLY FOR PHOTOGRAPHING CAVITY WALLS
Filed Oct. 9, 1950  2 Sheets-Sheet 1

INVENTOR.
R. G. PIETY
BY
Hudson & Young
ATTORNEYS

INVENTOR.
R. G. PIETY
BY
Hudson & Young
ATTORNEYS

Patented Jan. 26, 1954

2,667,109

UNITED STATES PATENT OFFICE 2,667,109

CAMERA ASSEMBLY FOR PHOTOGRAPHING CAVITY WALLS

Raymond G. Piety, Bartlesville, Okla., assignor to Phillips Petroleum Company, a corporation of Delaware Application October 9, 1950, Serial No. 189,185

8 Claims. (Cl. 95—11)

This invention relates to a camera adapted to take a picture of a wall of a cavity. In one of its aspects, it relates to a bore hole camera capable of taking a plurality of pictures vertically of the formations penetrated by a bore hole which contains a fluid. In another of its aspects, it relates to a means for removing opaque fluid from the position between a bore hole camera and the walls of the bore hole.

In the prior art, there have been disclosed bore hole or cavity camera assemblies which employ a rigid transparent window formed from such materials as glass or a transparent plastic through which the wall of a bore hole or other cavity is viewed by the camera's optical system which occupies a fixed position opposite such window. The transparent window is ordinarily of great thickness to withstand the high pressures encountered in a bore hole and the problem of sealing the juncture of such window with the camera casing against leaks of fluid into the camera itself has been particularly difficult. In addition, such a bore hole camera views only a few inches of vertical distance along the bore hole wall when in any given position; and in order to take a plurality of pictures of the walls of a bore hole, it is ordinarily necessary to raise or lower the entire bore hole camera assembly by means of a cable to succeedingly adjacent positions in order to obtain a vertical panoramic view of the walls of the bore hole. Obviously, such means of raising or lowering of the bore hole camera assembly makes it difficult to accurately position the camera in order to take succeeding pictures which are correctly spaced apart. Still further, many bore holes or other cavities contain an opaque fluid such as drilling mud which must be removed in order to permit the camera to take pictures of the bore hole walls. In the prior art, the removal of such opaque fluid has ordinarily been accomplished by packing off a suitable length of bore hole above and below the camera and then removing the opaque fluid from this packed-off region by displacing it with clear water pumped thereinto. Obviously, such a procedure entails cumbersome equipment, such as packing rings, which is difficult to correctly position in the bore hole.

According to this invention there is provided a camera assembly capable of taking pictures of the walls of a bore hole or other cavity, such as the gastral tract of the human body, wherein any opaque fluid which may exist between the camera and the walls of the bore hole or cavity is displaced therefrom by a flexible transparent diaphragm or membrane, such as a rubber membrane. In general, the camera assembly or tool includes a container, such as a tube, which can be lowered into the bore hole or other cavity and which can be filled with clear water from a source at the working surface of the cavity or from any other source. A window is cut from the wall of the container or tube and the camera and film are located inside the tube opposite the window therein. The window is covered by a flexible, transparent diaphragm or membrane through which the camera is adapted to take pictures of the wall of the bore hole or cavity lying on the opposite side of said diaphragm. Further, the diaphragm is expansible by means of pressure applied by the water contained in the tube so that it can be expanded outwardly from the tube to press against the wall of the bore hole thereby displacing any opaque fluid from between the camera's optical system and the wall of the bore hole. When the transparent diaphragm becomes stretched, it becomes transparent and serves as a window through which the pictures are taken. The transparency of the diaphragm is higher in water and other liquids than in air, since the interfacial change in refractive index is much smaller. The filling of the tube of water also serves to keep the film and the camera cool so that pictures may be taken in bore holes wherein there exists temperatures which would ordinarily be too high for use with ordinary photographic film. A spring biasing means is mounted on the tube opposite the diaphragm-covered window to push the window side of the tool against the bore hole wall. Inside of the tube is the camera proper which, as stated, is surrounded by water. A means is provided to move the optical assembly of the camera along the diaphragm-covered window while maintaining the film stationary in position to thereby take a plurality of pictures of a vertical section of the formation without moving the entire camera or tool assembly.

It is an object of this invention to provide a camera capable of taking a picture of the wall of a bore hole or other cavity and which is especially adapted to force any opaque fluid between said camera and said walls from between such space.

It is another object of this invention to provide a camera capable of taking a plurality of pictures of the walls of a bore hole or other cavity without moving an entire camera assembly upwardly or downwardly in the bore hole while taking such pictures.

Still another object of this invention is to provide a means for displacing an opaque fluid from the space between a camera lens and the object to be photographed.

Yet another object of this invention is to provide a bore hole camera capable of taking a plurality of pictures of the walls of the bore hole in the presence of an opaque fluid wherein the opaque fluid is removed from the space between the said camera and the said walls of the bore hole by means of an expansible transparent diaphragm adapted to be pushed against the walls of the bore hole to thereby replace the opaque fluid therefrom.

Figure 2A:
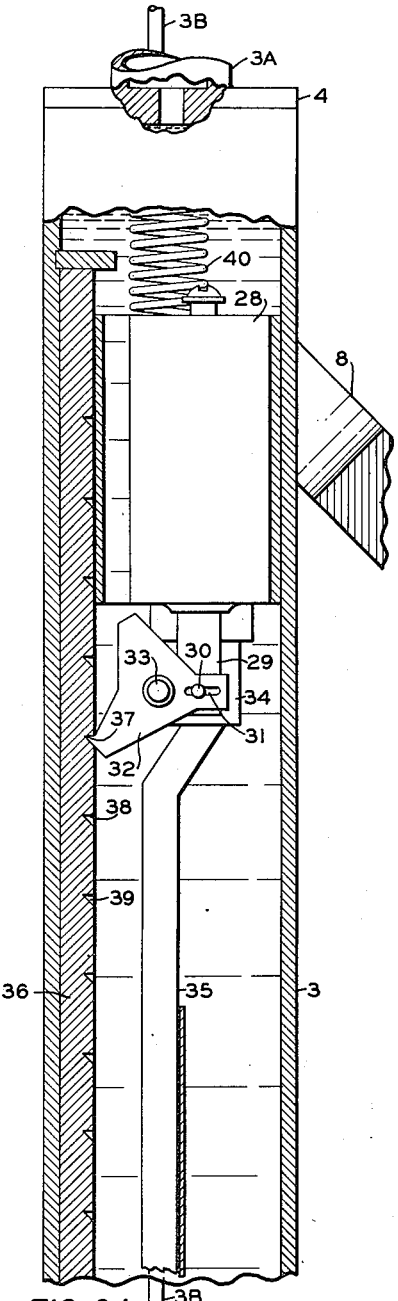
Figure 3:
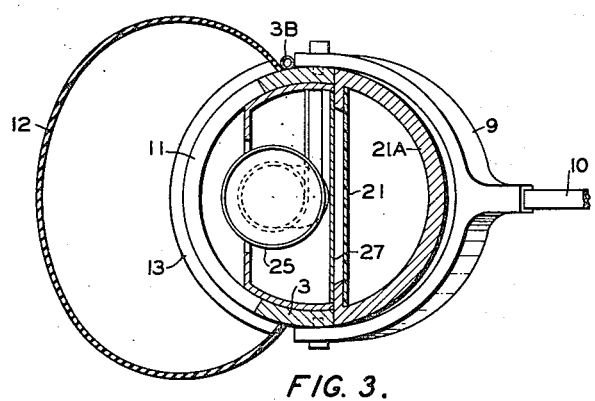
Figures 2B, 2C:
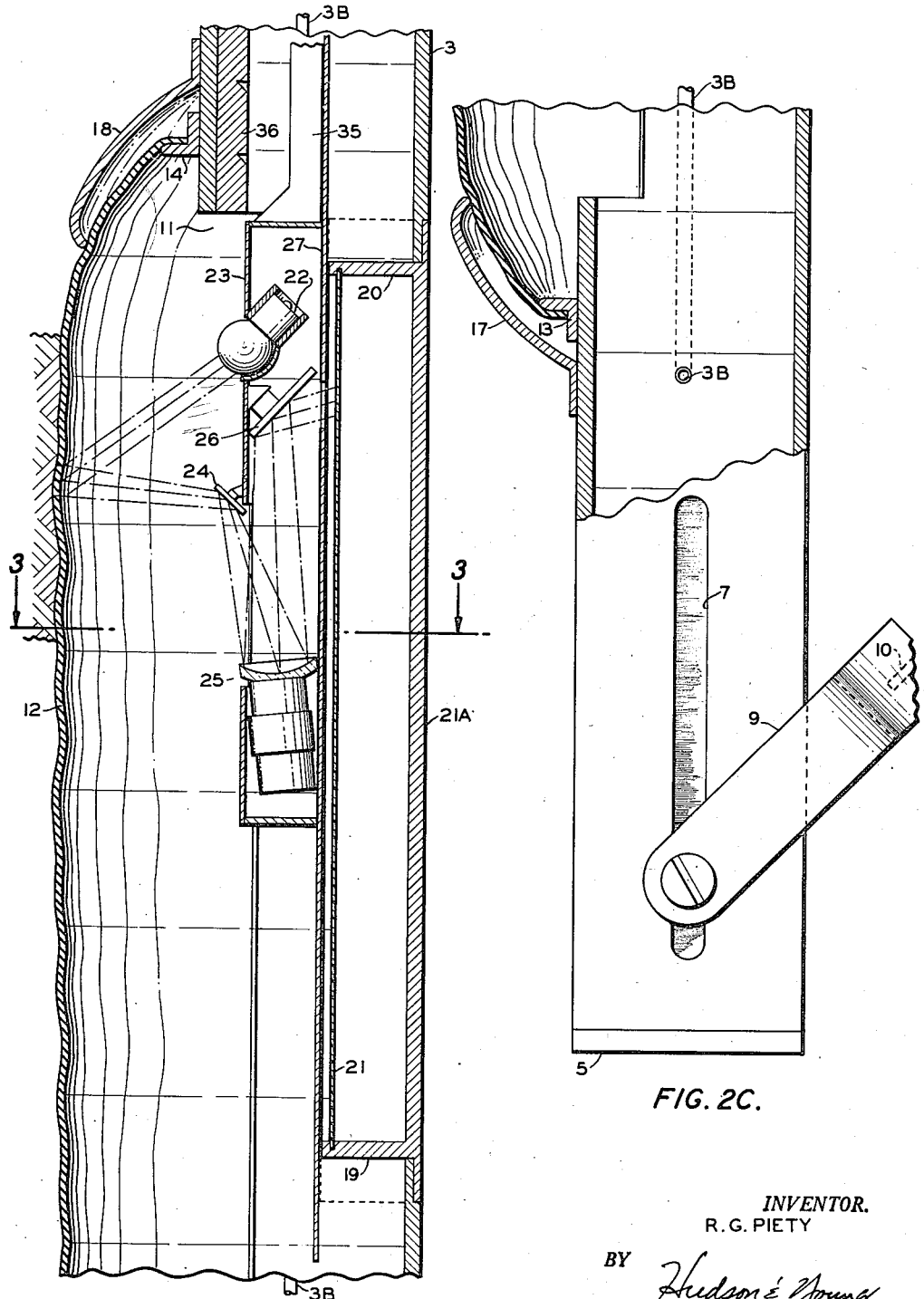

Other objects and advantages of this invention will be apparent to one skilled in the art upon consideration of the disclosure contained herein taken in conjunction with the attached drawings wherein Figure 1 represents a view of the camera asembly or tool of this invention lowered inside of a bore hole and wherein Figures 2A, 2B, 2C and 3 represent the detailed drawings of the internal apparatus of the bore hole camera assembly of this invention. Figures 2A, 2B and 2C together constitute a single partial cross-section of the apparatus of this invention. Figure 2B is joined at the top by Figure 2A and at the bottom by Figure 2C.

In Figure 1 the bore hole camera assembly is shown inside of a bore hole 1 having walls 2. The camera assembly includes a container which can be an elongated tube 3. Tube 3 can be a section of pipe of sufficient length to contain the necessary equipment which will be described hereinafter. A lowering tube 3A or other means such as a cable can be provided to lower and position tube 3 in bore hole 1. A water supply pipe 3B can be provided through which water can be pumped from the surface of the well to the interior of tube 3. The upper and lower ends of tube 3 are sealed by plates 4 and 5 to prevent intrusion of fluids from the bore hole into the tube. The ends of the tube 3 have slots 6 and 7 therein adapted to receive vertically slideable yokes 8 and 9. Slots 6 and 7 are recessed in tube 3 but do not extend completely therethrough. The external ends of yokes 8 and 9 are joined by a flexible member, such as spring 10, which is so constructed as to tend to cause yokes 8 and 9 to move along slots 6 and 7 in a direction toward each other. In this manner, when tube 3 is lowered into the bore hole, spring 10 pushes against one wall of the bore hole thereby forcing tube 3 against the opposite wall of the bore hole. As irregularities of the wall of the bore hole are encountered, spring 10 flexes yokes 8 and 9 along slots 6 and 7 thereby maintaining tube 3 snugly in a position against the wall of the bore hole. The length of slots 6 and 7 is such that either yoke 8 can be pushed to the lower end of slot 6 or yoke 9 can be positioned at the upper end of slot 7, while the other yoke is being moved along the length of its slot to permit spring 10 to freely flex according to the contours of the bore hole. Thus, for example, when yoke 8 is positioned in the lower end of slot 6, slot 7 is long enough to permit yoke 9 to slide freely therein irrespective of the extent spring 10 is compressed or extended in accordance with the contour of the bore hole walls. Alternatively, yoke 9 can be positioned at the upper end of slot 7 without causing yoke 8 to contact either end of slot 6 as spring 10 is flexed by the walls of the bore hole. In this manner, only one of yokes 8 or 9 can move to permit spring 10 to be freely flexed while the other yoke remains in a fixed position at the upper or lower end of its slot. Such an arrangement permits tube 3 to be readily moved upwardly or downwardly in the bore hole without binding. For example, when tube 3 is being lowered in the bore hole, spring 10 and yokes 8 and 9 will be pulled upwardly by friction with the wall of the bore hole along the length of tube 3 until yoke 9 seats at the upper end of slot 7. While yoke 9 is in this position, yoke 8 will be free to move along slot 6 thereby allowing spring 10 to flex.

Referring more particularly to Figures 2A, 2B, 2C and 3, tube 3 has a portion of its circumference removed to form a window opening 11. Surrounding window opening 11 is a flexible diaphragm 12 which can be comprised of a thin sheet of transparent material such as white rubber, Pliofilm, cellophane and the like. The transparent material should be sufficiently transparent when immersed in water to permit a picture to be taken therethrough. Flexible diaphragm 12 is attached to tube 3 by any suitable means but preferably is cemented to cleats 13 and 14. Flanges 17 and 18 can be provided to prevent tube 3 from approaching too closely to the walls of the bore hole and thereby provide a suitable focal distance between the optical apparatus of the camera and the walls of the bore hole. As shown, flanges 17 and 18 are formed to have a lip which extends from the wall of tube 3 to rest against the walls of the bore hole. Such flanges can be suitably shaped to prevent any undesirable gouging into the walls of the bore hole.

Inside of tube 3 and adjacent window 11 there are provided film supports 19 and 20 which are adapted to hold film 21 in a fixed position with respect to window 11. Film supports 19 and 20 can comprise any suitable type of bracket adapted to hold the film. For example, they can be a pair of slotted members having a plane surface attached therebetween adapted to support the film. Alternatively, film 21 can be mounted in a conventional cut-film holder which is fixedly attached to the inner walls of tube 3. Tube 3 can have a removable section 21A therein to provide a ready access for replacing film 21 with fresh film after it has been exposed.

The optical assembly can comprise a light source 22 which can be any suitable type of light adapted to provide sufficiently strong light to enable the film to be exposed. Light source 22 can be an ordinary low voltage light bulb such as a 6 volt, 3 candlepower bulb. Alternatively, light source 22 can be a stroboscopic light capable of delivering a peak illumination of at least a million lumens for a period of approximately $\frac{1}{5000}$ second. A source of energy (not shown) for energizing light source 22 can be provided in the upper portion of tube 3 and connected thereto by means of suitable wires which can be situated in grooves (not shown) in the wall of tube 3. A switch for controlling the energization of light source 22 can be located at the upper end of the bore hole. Light source 22 is attached to a slideable support 23 in such a fashion that light is directed outwardly as shown to pass through diaphragm 12 and to then be reflected by the wall of the bore hole which it is desired to photograph. A plane mirror 24 is attached to support 23 in such position as to receive the light reflected from light source 22 by the portion of the wall of the bore hole which it is desired to photograph. A concave mirror 25 is attached to support 23 to receive the light reflected from plane mirror 24 and an additional plane mirror 26 is likewise attached to support 23 to receive the reflected light from concave mirror 25 and to reflect such light onto film 21. Light source 22 and mirrors 24, 25, 26 are all maintained on support 23 in a fixed position relative one to the other and are adapted to be moved with support 23 downwardly with respect to the surface of film 21 which remains in a fixed position.

As shown in Figures 2A, 2B, 2C and 3, support 23 is adapted to slide inside of tube 3 and can be so shaped that its outer surface acts as a bearing surface against the inner surface of tube 3. If desired, suitable means, such as roller bearings, can be positioned between support 23 and tube 3 to provide a maximum ease of slideability of support 23 along tube 3.

A baffle 27 is attached to support 23 as shown to prevent stray or incident light from light source 22 from striking film 21. The baffle can comprise a sheet or plate of opaque material having an opening therein sufficiently large to permit the reflected light from mirror 26 to pass therethrough onto film 21.

An optical system positioning means is provided in the upper portion of tube 3. Such means can comprise a solenoid 28 operatively connected by means of core 29 carrying a pin 30 sliding in slot 31 to a ratchet 32. Core 29 is adapted to be moved upwardly when solenoid 28 is activated by a source of energy (not shown) which can be located at the surface of the bore hole. Core 29 can also be biased downwardly with respect to solenoid 28 by means of a suitable spring 40. Ratchet 32 is pivoted about axis 33 which is mounted on support 34 attached to the casing of solenoid 28. A support member 35 is employed to connect solenoid 28 through support 34 to support 23. Attached to the wall of tube 3 adjacent to ratchet 32 is a notched track 36 which has a plurality of notches 37, 38, 39, etc., recessed therein to receive the tooth of ratchet 32. Notches 37, 38, 39, etc., are spaced apart a distance equal to the length of the successive exposures desired upon film 21. A biasing means, such as a spring 40, can be provided to urge solenoid 28 and all elements dependent therefrom downwardly through tube 3. Alternatively, solenoid 28 and ratchet 32 can be attached to tube 3 and track 36 made slideable therealong and attached by a support to support 23.

In operation, the camera assembly is lowered in the bore hole to a position such as that shown in Figure 1. Water is then pumped through pipe 3B into the inner portion of tube 3 from a source in the surface of the bore hole to thereby cause flexible window 12 to be extended against the walls of the bore hole. Alternatively, water can be pumped from a reservoir (not shown) in tube 3 by an electrically driven pump to extend window 12. In so doing, any opaque fluid between the walls of the bore hole and the camera assembly will be displaced by the extension of the flexible diaphragm so that any light emitted from light source 22 will pass through clear water inside of tube 3 and not be absorbed by any opaque fluid which had theretofore existed along the bore hole. Spring 10 bears against one wall of the bore hole and acts to pull yokes 8 and 9 together along slots 6 and 7 thereby forcing the camera assembly in tube 3 against the opposite wall of the bore hole as shown in Figure 1. When the camera assembly has been so positioned, the switch at the surface of the bore hole can be thrown to connect light source 22 with its source of energy so that it will be lighted to expose a suitable portion of film 21 to an adjoining portion of the bore hole wall. The time of exposure can thus be readily controlled. Then, in order to move the optical system to expose a new portion of film 21, solenoid 28 can be energized to retract core 29 into the solenoid thereby disengaging ratchet 32 from notch 37 of track 36. The optical assembly, as well as solenoid 28 and ratchet 32, will then slide downwardly along track 36 along the inside of tube 3. Immediately after ratchet 32 has been disengaged from notch 37, the source of energy at the surface of the bore hole is disconnected from solenoid 28 whereby ratchet 32 is pushed laterally by the spring in solenoid 28 which biases core 29 downwardly. When the entire optical assembly has been lowered sufficiently, the engaging tooth of ratchet 32 will engage notch 38 in track 36 thereby stopping further lowering of the optical assembly. The source of energy at the surface of the bore hole can again be connected to light source 22 thereby exposing the succeeding portion of film 21 to the next lower portion of the bore hole wall viewed by the optical assembly.

Thus, a series of pictures can be made of the walls of a bore hole without moving the entire camera assembly since only the optical assembly moves downwardly while the film remains stationary. If desired, only a portion of the available exposures on film 21 can be taken at any one position of the camera assembly. The entire camera assembly can then be lowered after removing a portion of the water contained in tube 3 to thereby collapse diaphragm 12.

When it is desired to expose the entire length of film 21 when tube 3 is positioned at a single location, track 36 can be replaced with a rack and solenoid 28 and ratchet 32 can be replaced with a pinion gear connected to an electric motor in such a manner that the motor can drive the optical assembly continuously along film 21. When so operating with a low energy light source such as the 6 volt bulb described above, the light can be permitted to burn continuously to expose film 21 as it is moved therealong. When light source 22 is comprised of a stroboscopic light as described, a switch can be attached to the moving optical assembly to be actuated by tripping projections mounted on a track similar to the notches in track 36. When the image is not magnified by the optical system, the movement of the optical system past film 21 will not blur the image cast thereon even though the light source is burned continuously.

As stated, the camera assembly of this invention is particularly adapted to be employed in regions wherein such high temperatures exist that a negative material could not ordinarily be employed. In the instant camera, the water employed to force diaphragm 12 against the bore hole wall cools the negative or film thereby preventing damage by heat. It is often desirable to circulate water in through pipe 3B into tube 3 and thence out tube 3A to provide adequate cooling of the film. Tube 3B should extend to the lower end of tube 3 to provide a positive circulation of water around film 21. Suitable dyes can be dissolved in the water to provide any desired filter effects for the film. If desired, pipe 3B can be omitted and water can be circulated through tube 3 by means of tube 3A. An orifice of suitable size or other flow regulating means can then be provided to permit the escape of water from tube 3 into the bore hole. The desired pressure can be exerted in tube 3 by regulating the rate at which water is passed through tube 3A into tube 3. Alternatively, tubes 3A and 3B can be replaced by a reservoir of water situated in a portion of tube 3, which water can be circulated in tube 3 by a pump actuated by an electric motor.

One of the advantages derived from employing the camera assembly of this invention is that it can be employed in regions of high pressure such as those existing at the bottom of a well filled with a drilling mud or other opaque material. Thus, the water passed into tube 3 can be under a pressure which is only slightly higher or lower than that of the well and, therefore, it is not necessary that high pressure fittings be employed to prevent seepage of the opaque fluid into the interior of tube 3.

Although one type of optical system has been shown, it is obvious that other optical systems can be devised without departing from the scope of this invention. In any such optical system, the image is preferably neither magnified nor reduced in size while being reflected onto the film. Also, it is preferred that the image be reflected onto the film in the correct position, i. e., not inverted.

The camera assembly of this invention can be suitably adapted to be employed for photographing the walls of many different types of cavities, such as those existing in the human or in animal bodies. It can also be employed to photograph the walls of a vessel containing an opaque fluid.

When it is desired to photograph an object existing in a clear fluid such as sea-water, diaphragm 12 can be omitted from the camera assembly of this invention and the photograph can be taken through the clear fluid then existing around the camera assembly without displacing such fluid with a clear fluid coacting with diaphragm 12 as disclosed above. In such case, the camera assembly can comprise film 21 affixed to a support such as tube 3 and the optical assembly which includes light source 22 and a light transmitting means, such as mirrors 24, 25, and 26. Also, a means for moving such optical assembly along film 21 should be included and such means can comprise ratchet 32 and an actuating mechanism such as solenoid 28 as above described.

While the invention has been described in connection with a present, preferred embodiment thereof, it is to be understood that this description is illustrative only and is not intended to limit the invention, the scope of which is defined by the appended claims.

I claim:

1. A camera assembly adapted to photograph the wall of a cavity which comprises, in combination, a fluid-tight tube having a portion of its wall removed to form an opening therein, a transparent flexible diaphragm attached to said tube and extending across said opening, means for introducing and withdrawing water from the interior of said tube to thereby extend said diaphragm against an adjacent wall of said cavity to be photographed, a photographic film mounted inside said tube opposite said opening, an optical system movable parallel to said film, said optical assembly comprising a light source capable of periodically flashing to expose said film, a plane mirror adapted to receive light which is reflected from said light source by said wall of said cavity to be photographed and to reflect said light to an image focusing concave mirror, a second plane mirror adapted to receive light reflected from said concave mirror and to reflect said light onto said film to form a photographic image thereon, a baffle situated between said light source and said film to prevent any light from said source except said reflected image from striking said film, a means for moving and positioning said optical system along said film which comprises a solenoid slidably mounted in the upper portion of said tube, a notched track attached to said tube, a ratchet adapted to engage succeeding notches in said track and adapted to be disengaged therefrom by movement of a core in said solenoid when the latter is momentarily energized and a means for biasing said tube against the wall of said cavity so that said diaphragm can be extended to exclude any opaque fluid from the space between said optical system and said wall which comprises a pair of yokes each slidably mounted in slots located at the ends of said tube and a bowed spring member adapted to draw said yokes along said slots to force said tube against the wall of said cavity.

2. A camera assembly adapted to photograph the wall of a cavity which comprises, in combination, a fluid-tight tube having a portion of its wall replaced by a transparent flexible diaphragm, means for introducing water into said tube to thereby extend said diaphragm against a wall of said cavity to be photographed, a photographic film mounted inside said tube, an optical system movable parallel to said film, said optical assembly comprising a light source capable of periodically flashing to expose said film, a plurality of mirrors including an image focusing concave mirror adapted to receive light which is reflected from said light source by said wall to be photographed and to reflect said light to said film to form an image thereon, a means for moving and positioning said optical system along said film which comprises a solenoid slidably mounted in the upper portion of said tube, a notched track attached to said tube, a ratchet adapted to engage succeeding notches in said track and adapted to be disengaged therefrom by said solenoid when the latter is momentarily energized and a means for biasing said tube against the wall of said cavity so that said diaphragm can be extended to exclude any opaque fluid from the space between said optical system and said wall which comprises a pair of yokes each slidably mounted in slots located at the ends of said tube and a bowed spring member adapted to draw said yokes along said slots to force said tube against the wall of said cavity.

3. A camera assembly adapted to photograph the wall of a cavity which comprises, in combination, a container having a portion of its wall replaced by a transparent flexible diaphragm, means for extending said diaphragm against an adjacent wall of said cavity to be photographed, a photographic film mounted inside said container, an optical system, including a source of light movable parallel to said film, said optical system adapted to transmit a photographic image of said wall to said film, a means for moving and positioning said optical system along said film which comprises, a ratchet adapted to fix said optical system at a plurality of succeeding points along a notched track within said container, means for actuating said ratchet, and a means for biasing said container against the wall of said cavity so that said diaphragm can be extended into contact with said wall to exclude any opaque fluid from the space between said optical system and said wall which comprises a bowed spring member having its ends slidably connected with said container in such manner that the bowing of said spring member against the wall of said cavity forces the diaphragm containing wall of said container against the wall to be photographed.

4. A camera assembly comprising, in combination, a container having a portion of its wall replaced by a transparent flexible diaphragm, means for extending said diaphragm against an adjacent wall of a cavity to be photographed, a photographic film mounted inside said container, an optical system movable with respect to said film and adapted to transmit an image of said wall to said film, a light source movable longitudinally with respect to said film, an externally operated means for moving and positioning said optical system along said film while said camera assembly is in said cavity, and a means for biasing said container against the wall of said cavity so that said diaphragm can be extended into contact with said wall to exclude any opaque fluid from the space between said optical system and said wall.

5. A camera assembly adapted to photograph the wall of a cavity which comprises, in combination, a fluid-tight tube having a portion of its wall removed to form an opening therein, a transparent flexible diaphragm attached to said tube and extending across said opening, means for introducing and withdrawing water from the interior of said tube to thereby extend said diaphragm against an adjacent wall of said cavity to be photographed, a photographic film mounted inside said tube opposite said opening, an optical system movable parallel to said film, said optical assembly comprising a light source capable of periodically flashing to expose said film, a plane mirror adapted to receive light which is reflected from said light source by said wall of said cavity to be photographed and to reflect said light to an image focusing concave mirror, a second plane mirror adapted to receive light reflected from said concave mirror and to reflect said light onto said film to form a photographic image thereon, a baffle situated between said light source and said film to prevent any light from said source except said reflected image from striking said film, a means for moving and positioning said optical system along said film which comprises a solenoid slidably mounted in the upper portion of said tube, a notched track attached to said tube, and a ratchet adapted to engage succeeding notches in said track and adapted to be disengaged therefrom by movement of a core in said solenoid when the latter is momentarily energized.

6. A camera assembly adapted to photograph the wall of a cavity which comprises, in combination, a fluid-tight tube having a portion of its wall replaced by a transparent flexible diaphragm, means for introducing water into said tube to thereby extend said diaphragm against a wall of said cavity to be photographed, a photographic film mounted inside said tube, an optical system movable parallel to said film, said optical assembly comprising a light source capable of periodically flashing to expose said film, a plurality of mirrors including an image focusing concave mirror adapted to receive light which is reflected from said light source by said wall to be photographed and to reflect said light to said film to form said image thereon, a means for moving and positioning said optical system along said film which comprises a solenoid slidably mounted in the upper portion of said tube, a notched track attached to said tube, and a ratchet adapted to engage succeeding notches in said track and adapted to be disengaged therefrom by said solenoid when the latter is momentarily energized.

7. A camera assembly adapted to photograph the wall of a cavity which comprises, in combination, a container having a portion of its wall replaced by a transparent flexible diaphragm, biasing means adapted to move the diaphragm containing wall of said container against the wall of said cavity, means for extending said diaphragm against an adjacent wall of said cavity to be photographed, a photographic film mounted inside said container, an optical system including a source of light movable parallel to said film and adapted to transmit a photographic image of said wall to said film, a means for moving and positioning said optical system along said film which comprises a ratchet and notched track means adapted to fix said optical system at a plurality of succeeding points along said container, and means for actuating said ratchet.

8. A camera assembly comprising, in combination, a container having a portion of its wall replaced by a transparent flexible diaphragm, means for extending said diaphragm against an adjacent wall of a cavity to be photographed, a photographic film mounted inside said container, an optical system movable with respect to said film and adapted to transmit an image of said wall to said film, a light source movable longitudinally with respect to said film, means for moving and positioning said optical system along said film while said camera assembly is in said cavity, and means for biasing the diaphragm containing wall of said container against the wall of said cavity so that said diaphragm can be extended into contact with said wall to exclude any opaque fluid from the space between said optical system and said wall.

RAYMOND G. PIETY.

References Cited in the file of this patent

UNITED STATES PATENTS

| Number | Name | Date |
|---|---|---|
| 1,658,537 | Reinhold | Feb. 7, 1928 |
| 1,727,495 | Wappler | Sept. 10, 1929 |
| 2,185,508 | Kunze | Jan. 2, 1940 |
| 2,190,901 | Wilcox et al. | Feb. 20, 1940 |
| 2,259,084 | Rosenhaft | Oct. 14, 1941 |

FOREIGN PATENTS

| Number | Country | Date |
|---|---|---|
| 502,331 | Great Britain | Mar. 15, 1939 |